United States Patent Office 3,804,749
Patented Apr. 16, 1974

3,804,749
PROCESS FOR DESULFURIZATION OF CHEMICAL MEDIA OR OF MATERIALS CONTAINING SULFUR AND/OR ITS DERIVATIVES
Prosper Etienne Cholet, 273 Sandford St., New Brunswick, N.J. 08902, and Jean Rene Lucien Martin, 430 E. 86th St., New York, N.Y. 10028
No Drawing. Filed Aug. 21, 1972, Ser. No. 282,023
Claims priority, application France, Aug. 31, 1971, 7131551
Int. Cl. C10g *19/08*
U.S. Cl. 208—241
7 Claims

ABSTRACT OF THE DISCLOSURE

The invention concerns a process for desulfurization of chemical media or of materials containing sulfur and/or its derivatives wherein said media or materials to be desulfurized are contacted with a coordination complex of $BF_3$ in solution in a solvent and said media or said materials are separated from said solution.

---

The present invention concerns a process for desulfurization of chemical media or of materials containing sulfur and/or its derivatives.

It is well known that sulfur and/or its derivatives are undesirable according to the field of application of the media or materials in which they are present, because of their unpleasant odor or their corrosive nature.

Many processes are known for the elimination of these undesirable compounds. They generally call for various chemical treatments, for instance, treatments with sulfuric acid followed by neutralization with a base. Moreover, these treatments not only require the use of more than one agent or reagent, but they require also at times the use of heat, and of other manipulations which increase all the more the cost of the desulfurization process, without insuring a complete elimination of the sulfur.

In comparison, the purpose of the present invention is to provide a simple and economical process for desulfurization, with an efficiency of at least 90%.

The process of the invention is characterized by the fact that the substance to be desulfurized is contacted with a coordination complex of $BF_3$ in solution in a solvent, and that said solution is separated from said substance.

According to other characteristics:
The operation takes place at room temperature;
The $BF_3$ complex is a complex of coordination of $BF_3$ with a component containing oxygen and/or nitrogen;
The $BF_3$ complex is a complex of coordination of $BF_3$ with a compound selected from the group comprising: water, alcohols, ethers, esters, mono- and polyamines, hydroxylamines, amides, amines and substituted amides, ammonia, urea, mono- and polyalkylamines, hexamethylenetetramine and the like;
The solvent of the $BF_3$ complex is water or a solvent selected from the group comprising mono- and polyolefin glycols and their ethers;
The concentration of the solution of the $BF_3$ complex in its solvent should preferably be between 10% and 40% by weight.
According to the invention the process is applicable for desulfurizing every medium containing sulfur derivatives and is especially of interest for the removal of sulfur in organic media, notably hydrocarbon media such as those of the petroleum industry, whether it concerns raw petroleum or products having already been submitted to several industrial processes, such as lubricating oils, motor fuels, heating fuels, etc. The product or substance to be desulfurized can be a solid, a liquid or a gas. However, it is advantageous—and this constitutes another characteristic of the invention—to operate in liquid medium, the essential condition to carry out the process being that the liquid medium to be desulfurized should not be miscible with the solvent of the $BF_3$ complex used.

Therefore: if the product to be desulfurized is a solid, it should be first dissolved in a solvent, and the $BF_3$ complex should be dissolved in a solvent so selected as not to be miscible with the solvent of the product to be desulfurized; if the product to be desulfurized is a liquid, the solvent of the $BF_3$ complex will be selected in such a way that it will not be miscible with that liquid; finally, if the product to be desulfurized is a gas, it will be made to bubble in a solution of the $BF_3$ complex having the minimum of solvent power for the gas to be desulfurized.

Other characteristics and advantages of the invention will be brought out more clearly in the following description.

This description will be made chiefly taking as an example of a medium to be desulfurized, hydrocarbons, especially hydrocarbons derived from petroleum. However, this particular case should not be considered as a limitation of the application of the method of the invention because the process is carried out, as explained above, in liquid phases, one of these at least being a hydrocarbon solvent.

As a matter of fact, we have discovered surprisingly—and this constitutes the interest of the invention—that if a liquid hydrocarbon containing various proportions of sulfur derivatives is contacted with a coordination complex of $BF_3$ with a compound containing at least one atom of nitrogen and/or oxygen, in a solution in a solvent not miscible with the sulfur containing hydrocarbon, a coloration of the complex solution varying from yellow to dark violet and even to black, is obtained rapidly and at room temperature. The separation of this colored solution, whether saturated or not, from the rest of the medium, and its analysis have allowed to verify the presence of sulfur derivatives, and to calculate their amount. The results thus obtained have shown that of the sulfur present as derivatives in the hydrocarbon at the start of the treatment, at least 90% were found in the separated phase containing the $BF_3$ complex, resulting from a simple contact of a few minutes at room temperature.

Therefore, this discovery allows a most interesting industrial operation in those instances where one looks for a practically total elimination of sulfur derivatives from materials containing them. The petroleum industry constitutes a domain of application of the highest interest, without excluding evidently the other industrial domains where the elimination of sulfur derivatives is actively sought.

In practice it is sufficient to contact, in liquid phase and at room temperature, during a few minutes preferably with stirring, the medium to be desulfurized with a solution of a coordination of $BF_3$ complexed with a compound containing at least one atom of nitrogen and/or oxygen, providing that the solvent of the complex is not miscible with the liquid medium to be desulfurized.

Amongst the $BF_3$ complexes suitable for the invention are those obtained with water, alcohols, ethers, esters, mono- and polyamines, hydroxylamines, amides, amines and substituted amides, ammonia, urea, mono- and polyalkylamines, and especially with water, ammoniac, monoethylamine, triethanolamine, hexamethylenetetramine and urea.

Aqueous solutions of the $BF_3$ complex give results. However, it is preferred to use solutions of this complex in organic solvents, such as those selected from the group comprising mono- and polyolefine-glycols and their ethers. This is done in order to promote a better coefficient of separation between the phases, and especially to orient the displacement towards the phase containing the $BF_3$. Among those solvents we shall mention preferably dipropylene-glycol and triethylene-glycol, due to the fact that water is miscible with them in small proportions. This is of interest when water is present in small proportions in the medium to be desulfurized because when the method of the invention is put into effect, the separation of an additional aqueous phase is avoided. However, it is well known that such solutions are more or less viscous according to their concentration, and men skilled in the art will easily adjust this concentration according to the ease of manipulation desired. A range of concentrations which is found to be generally interesting falls between 10% and 40% by weight.

In any case, it must be stated clearly that only very small quantities of the desulfurizing solution of the invention are necessary to obtain excellent results, as shown in the following examples stated below, which bring out the fact that a quantity as small as 2 grams of a 20% solution used to treat 1000 grams of a product containing sulfur in the range of 500 p.p.m. of sulfur (calculated as elemental sulfur) is sufficient to eliminate at least 90% of said sulfur.

EXAMPLE 1

To 1000 grams of heating fuel oil No. 2 are added 2 grams of a 20% solution in triethyleneglycol of a $BF_3$-urea complex commercially available, which contains one molecule of urea for one molecule of $BF_3$. The preparation is mixed for 10 minutes with an agitator of the Eppenbach type. The preparation is left to settle, and by means of any known physical operation such as decantation, centrifugation, etc., the phase constituting the fuel oil is separated from the phase made of the $BF_3$ complex plus the undesirable products extracted from the fuel oil. If necessary this fuel, already purified and desulfurized, can be treated a second and even a third time in a manner similar to that described above. The following results are obtained:

|                    | Percent of S in fuel oil | Percent of S removed |
|---|---|---|
| Before treatment   | 0.428 |       |
| After 1st treatment| 0.046 | 90.6  |
| After 2d treatment | 0.029 | 93.2  |
| After 3d treatment | 0.026 | 94    |
| After 4th treatment| 0.024 |       |

The 4th treatment was made in order to make sure that any subsequent treatment was unnecessary.

These results show that after only one treatment 90% of the sulfur present is eliminated, and that the 3rd and 4th treatments eliminate further only a relatively small percentage, the difference obtained could be attributed to the precision of the analytical method. If, in practice, it is deemed necessary to have a 2nd treatment, the solution used for this 2nd treatment could be used for the first treatment of the next batch of fuel oil. This implies that the carrying out of the invention is by means of separate batches. But it is evident that continuous operations can be envisaged by use of counter-flow processes.

Identical results are obtained by using as desulfurizing agent according to the invention a $BF_3$-ethylether complex, as well as $BF_3$ dihydrate, stabilized with 1.5–2% methanol.

The sulfur contents given in this example as well as in the following examples were obtained by using a modification of the method ASTM-D-1266-64T, where the acidimetric or gravimetric determinations are replaced by a colorimetric determination. The gases issuing from the combustion of the sample to be analyzed are made to bubble in a 0.2 M solution of sodium tetrachloromercurate which has been inserted previously in the absorber. At the end of the treatment, an aliquot part of the liquid so treated is taken. A given quantity of 0.2% formaldehyde solution, and of a 0.4% pararosaniline solution are added to it. The absorption curve is read in a suitable apparatus and compared with a blank test sample made with the analytical solutions.

EXAMPLE 2

Other fuels with a sulfur content comparable to that of the fuel oil described in Example 1 were treated in the same manner. The percentages of sulfur removed range between 88% and 91% after the first treatment. After a third treatment, the results range from 95% to 99%.

EXAMPLE 3

Fuels of diesel motor types, and jet fuels known in the petroleum industry as JP4, were treated with the method described in Example 1.

|                    | Percent of S in fuel oil | Percent of S removed |
|---|---|---|
| Before treatment   | 0.350 |       |
| After 1st treatment| 0.160 | 54.32 |
| After 2d treatment | 0.045 | 90.43 |
| After 3d treatment | 0.011 | 96.82 |

Following the results obtained with the third treatment, no further treatments were made.

EXAMPLE 4

A gasoline for automobiles, containing no tetraethyl lead, was treated as in Example 1. The following results were obtained.

|                    | Percent of S in lead-free gasoline | Percent of S removed |
|---|---|---|
| Before treatment   | 0.318 |       |
| After 1st treatment| 0.142 | 55.34 |
| After 2d treatment | 0.028 | 91.19 |
| After 3d treatment | 0.016 | 94.97 |

Following these results, a 4th treatment is deemed superfluous.

In this example, as well as in Example 3, it is believed that the relatively small percentages removed during the first treatment are due to the presence in the fuels of certain additives which are also eliminated by this treatment. Consequently, the second treatment is allowed to act in its full efficiency, which was probably curtailed in the first treatment by these additives. This is why it is advisable whenever possible, and especially in petroleum refineries, to use the desulfurizing process according to the invention on materials free of additives which are customarily used to improve some of their properties.

It is to be clearly stated here that the examples described above concern desulfurization of liquid hydrocarbons at room temperature. However, if very viscous hydrocarbons are to be treated, a slight heating can be considered to facilitate the treatment. However, the increase of temperature is limited by the temperature of dissociation of the $BF_3$ complex utilized. In practice, it should not be necessary to operate above 60-degrees centigrade.

In the case of viscous products, besides reducing the viscosity by heating, there exists another solution, i.e. to dilute the product with a sulfur-free hydrocarbon. This second solution can be used quite well with petroleum derivatives which are so thick and viscous that they can be considered solids. For instance, this is the case of certain mazouts, and at the limit, of tars. It is well known that these products contain appreciable quantities of sulfur and/or its derivatives. The invention allows their desulfurization, because it is sufficient to dissolve or extend them in an appropriate solvent (not miscible with treating solution) and to proceed with these mixtures as described in the above examples, with or without additional heating. The solvent or diluent to be used could be a hydrocarbon already desulfurized, or a hydrocarbon to be desulfurized.

The interest of the invention lies not only in the simplicity of its working process (bringing 2 liquids in contact in the manner of liquid-liquid extraction processes), but in its cost price. The operation is conducted at room temperature, or if needed at a temperature not exceeding 60 degrees centigrade, which makes it unecessary to consider special sources of energy. Moreover, the quantities required for the desulfurizing solution are minimal (2 grams of a 20% solution for 1000 grams of the solution to be treated) with a desulfurizing rate of at least 90%. The equipment needed is simple. It does not require large investments. It can be envisaged in any refinery or in an already existing installation without having to change radically its mode of operation.

Furthermore, it is possible to recuperate the $BF_3$ as well as the sulfur after the treatment by submitting the solution to any appropriate process which is not a part of the scope of the invention.

Also it has been found that by using the process described in the invention, not only is the desulfurization practically total—and therefore the disagreeable odor coming from the sulfur compounds is eliminated—but there is also an improvement and a clarification in the color of the treated product.

It is of course understood that the present invention has been described by way of explanation not limitation, and that any useful modification can be brought to it without going beyond its scope as defined in the following claims.

We claim:

1. A process for removing at least 90% of sulfur from sulfur-containing petroleum hydrocarbon, comprising
   providing a petroleum-immiscible solution of 10–40% by weight of a coordination complex of $BF_3$ in a petroleum-immiscible solvent, said solvent being selected from the group consisting of water, mono- and polyolefin-glycols and their ethers,
   mixing said petroleum-immiscible solution with the sulfur-containing petroleum to effect desulfurization, and
   separating the petroleum from the solution.

2. Process according to claim 1, wherein the contact between the medium to be desulfurized and the solution of $BF_3$ complex is made at room temperature.

3. Process according to claim 1, wherein the $BF_3$ complex is a coordination complex of $BF_3$ with a compound containing an atom selected from oxygen and nitrogen.

4. Process according to claim 3, wherein the $BF_3$ complex is a coordination complex of $BF_3$ with a compound selected from the group consisting of water, alcohols, ethers, esters, mono- and polyamines, hydroxylamines, amides, amines, substituted amides, ammonia, urea, mono- and polyalkylamines, monoethylamine, triethanolamine, hexamethylenetetramine, and urea.

5. Process according to claim 1, wherein the solvent of the $BF_3$ complex is selected from the group consisting of water and a solvent slightly water-soluble.

6. Process according to claim 5, wherein the solvent of the $BF_3$ complex is selected from the group consisting of mono- and polyolefin-glycols and their ethers.

7. A process in accordance with claim 1 wherein said petroleum hydrocarbon is selected from the group consisting of raw petroleum, heating fuel, motor fuel, lubricating oil, solid petroleum dissolved in a solvent immiscible with said petroleum-immiscible solvent, and gaseous petroleum hydrocarbon.

References Cited

UNITED STATES PATENTS

| 2,834,717 | 5/1958 | Shiah | 208—236 |
| 2,501,064 | 3/1950 | Liew et al. | 208—223 |

OTHER REFERENCES

"Separation of Sulfur and Aromatics From Petroleum," Industrial and Engineering Chemistry, vol. 43, No. 3, pp. 750–753, Scovill et al.

DELBERT E. GANTZ, Primary Examiner

J. M. NELSON, Assistant Examiner

U.S. Cl. X.R.

208—236, 232